C. P. VAUCLAIN.
JOINT.
APPLICATION FILED FEB. 11, 1913.
1,127,325.
Patented Feb. 2, 1915.
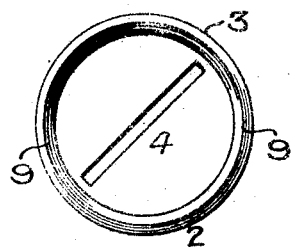
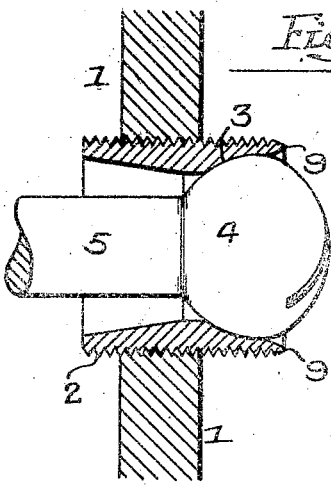
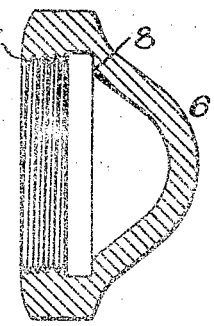
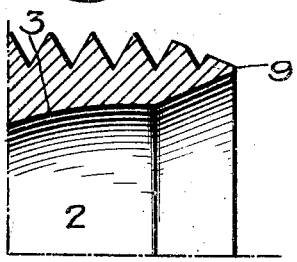
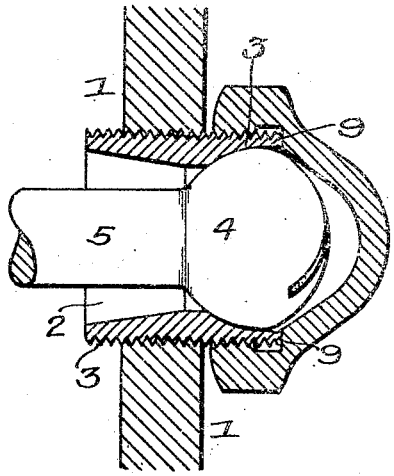
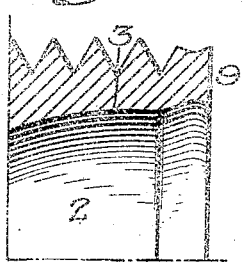
Witnesses—
Wills A Burrows.
Walter R Lullinger
Inventor—
Charles Parry Vauclain
by his Attorneys—
Howson Howson

UNITED STATES PATENT OFFICE.

CHARLES PARRY VAUCLAIN, OF ROSEMONT, PENNSYLVANIA, ASSIGNOR TO THE BALDWIN LOCOMOTIVE WORKS, OF PHILADELPHIA, PENNSYLVANIA, A CORPORATION OF PENNSYLVANIA.

JOINT.

1,127,325.   Specification of Letters Patent.   Patented Feb. 2, 1915.

Application filed February 11, 1913. Serial No. 747,689.

*To all whom it may concern:*

Be it known that I, CHARLES P. VAUCLAIN, a citizen of the United States, residing in Rosemont, county of Rosemont, State of Pennsylvania, have invented certain Improvements in Joints, of which the following is a specification.

The object of my invention is to make a steam tight joint between a stay bolt socket and its cap. This object I attain by forming a rib on the socket and breaking down and compressing the material of the rib by screwing the cap onto the socket, thus making a steam tight joint.

In the accompanying drawings:—Figure 1 is a sectional view showing the stay bolt socket and the cap detached therefrom and illustrating my invention; Fig. 2 is an end view of the socket; Fig. 3 is a sectional view, similar to Fig. 1, with the cap attached and the edge of the socket compressed to form a steam tight joint; Fig. 4 is an enlarged view of a portion of the socket section, showing the tapered end prior to being compressed by the cap; and Fig. 5 is a view, similar to Fig. 4, showing the end after being compressed by the cap to form the joint.

Referring to the drawings, 1 is the casing of a boiler. 2 is the threaded socket screwed into an opening in the boiler casing and having a seat 3 for the rounded head of the stay bolt 5, which connects one wall of the sheet of the boiler to another. While the stay bolt is always under tension, the joint between the head 4 of the stay bolt and the seat is not steam tight, consequently, a cap has to be used which has an internal screw thread 7 adapted to the thread on the periphery of the socket member 2. This cap has a flat surface 8 which, when the socket member is made in the ordinary manner, rests against the flat end of the socket member and in order to make a tight joint between the two parts, the surfaces have to be accurately finished or a gasket of copper, or other metal, is located between the two parts. This construction is not always satisfactory.

I have found by materially reducing the area of the end of the socket member, preferably by beveling one or both faces to form an annular rib 9, as indicated in the drawing, and arranging the surface 8 of the cap so that it will contact with the narrow edge of the rib that when the cap is screwed tightly onto the socket member, as illustrated in Fig. 3, it will compress the metal of this rib, forming its own seat, which will be steam tight in every instance, and making it possible to dispense with gaskets or other packing and also dispensing with the grinding of the parts.

I may not carry the compression to the crushing point or past the elastic limit of the material which will make a good joint, as illustrated in Fig. 3. I may, however, carry the compression past the elastic limit in some instances, forming a joint as illustrated in Fig. 3, and the end of the rib will be compressed, as illustrated in Fig. 5, which will also make a good joint. In this particular instance a seat is formed by compressing the metal of the rib.

I claim:

The combination of a threaded socket member having an annular tapered rib at one end and a cap having a thread adapted to the thread of the socket member and having an annular flat surface alining with the annular rib, the metal of the cap being of a hardness at least equal to the hardness of the metal of the socket member so that when the cap is screwed onto the end of the socket member the rib will be broken down and compressed and will form a fluid tight joint between the two parts.

In testimony whereof, I have signed my name to this specification, in the presence of two subscribing witnesses.

CHARLES PARRY VAUCLAIN.

Witnesses:
   WM. E. SHUPE,
   WM. A. BARR.